(12) United States Patent
Lee et al.

(10) Patent No.: US 12,249,175 B2
(45) Date of Patent: Mar. 11, 2025

(54) FINGERPRINT RECOGNITION DEVICE AND SMART CARD

(71) Applicant: SAMSUNG ELECTRONICS CO., LTD., Suwon-si (KR)

(72) Inventors: Han Sol Lee, Seongnam-si (KR); Duck-Soo Kim, Seoul (KR); Kwang Hyuk Bae, Seoul (KR); Yeol Min Seong, Seoul (KR); Moon Kyu Song, Seoul (KR); Seong Wook Song, Seoul (KR); Jun Seo Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 528 days.

(21) Appl. No.: 17/569,059

(22) Filed: Jan. 5, 2022

(65) Prior Publication Data

US 2022/0343672 A1 Oct. 27, 2022

(30) Foreign Application Priority Data

Apr. 26, 2021 (KR) .................. 10-2021-0053577
Jun. 30, 2021 (KR) .................. 10-2021-0085496

(51) Int. Cl.
*G06V 40/12* (2022.01)
*G06V 10/46* (2022.01)
*G06V 10/82* (2022.01)

(52) U.S. Cl.
CPC .......... *G06V 40/1365* (2022.01); *G06V 10/46* (2022.01); *G06V 10/82* (2022.01); *G06V 40/1353* (2022.01); *G06V 40/1388* (2022.01)

(58) Field of Classification Search
CPC .... G06V 40/1365; G06V 10/46; G06V 10/82; G06V 40/1353; G06V 40/1388; G06V 40/40; G06N 3/08
See application file for complete search history.

(56) References Cited

U.S. PATENT DOCUMENTS

| 6,241,288 B1 * | 6/2001 | Bergenek ........... G06V 40/1365 283/67 |
| 2007/0031014 A1 * | 2/2007 | Soderberg .......... G06V 40/1371 382/125 |
| 2018/0025199 A1 * | 1/2018 | Ryshtun ............. G06V 40/1376 382/125 |

(Continued)

FOREIGN PATENT DOCUMENTS

| KR | 10-0481914 B1 | 4/2005 |
| KR | 10-2009-0125193 A | 12/2009 |

(Continued)

*Primary Examiner* — Wassim Mahrouka
(74) *Attorney, Agent, or Firm* — Muir Patent Law, PLLC (57) ABSTRACT

A fingerprint recognition device is provided. The fingerprint recognition device includes an image acquisition module acquiring a fingerprint image including an input fingerprint, a preprocessing module generating a preprocessed image by preprocessing the fingerprint image, a minutiae extraction module extracting coordinates of each of minutiae and orientation points of the input fingerprint from the preprocessed image and a fake detection module receiving regions-of-interest (ROIs), including the coordinates of each of the minutiae or orientation points of the input fingerprint, and determining whether the input fingerprint is a fake by performing learning using the received ROIs.

20 Claims, 11 Drawing Sheets

(56) References Cited

U.S. PATENT DOCUMENTS

2018/0060648 A1\* 3/2018 Yoo ........................ G06V 40/40
2020/0193117 A1\* 6/2020 Raff ....................... G06N 3/048

FOREIGN PATENT DOCUMENTS

| KR | 10-1236040 B1 | 2/2013 |
| KR | 10-1778552 B1 | 9/2017 |
| KR | 10-2138652 B1 | 7/2020 |
| KR | 10-2020-0137450 A | 12/2020 |

\* cited by examiner

FINGERPRINT RECOGNITION DEVICE AND SMART CARD

CROSS-REFERENCE TO RELATED APPLICATIONS

This application claims priority to Korean Patent Applications No. 10-2021-0053577, filed on Apr. 26, 2021, and No. 10-2021-0085496, filed on Jun. 30, 2021, and all the benefits accruing therefrom under 35 U.S.C. § 119, the disclosures of which are incorporated herein by reference in their entireties.

BACKGROUND

1. Field

The present disclosure relates to a fingerprint recognition device and a smart card.

2. Description of the Related Art

Fingerprint recognition, which is a type of biometrics, has been widely used due to its convenience, security, and economical efficiency. Fingerprint recognition involves acquiring an image of a fingerprint of a user via a sensor and verifying the user by comparing the acquired fingerprint image with a previously-registered fingerprint image. However, if a sophisticated fake fingerprint pattern is input to a sensor of a fingerprint recognition device, the fingerprint recognition device may not be able to detect the fake fingerprint pattern and may thus recognize the fake fingerprint pattern as being legitimate. For example, in a case where the sensor of the fingerprint recognition device is placed in contact with a material such as rubber, silicone, gelatin, epoxy, or latex with a fingerprint thereon, the material may be recognized as being a genuine fingerprint. For security, it is important to differentiate a genuine fingerprint from a fake.

SUMMARY

According to some embodiments of the present disclosure, there is provided a fingerprint recognition device including an image acquisition module acquiring a fingerprint image including an input fingerprint, a preprocessing module generating a preprocessed image by preprocessing the fingerprint image, a minutiae extraction module extracting coordinates of each of minutiae and orientation points of the input fingerprint from the preprocessed image and a fake detection module receiving regions-of-interest (ROIs), including the coordinates of each of the minutiae or orientation points of the input fingerprint, and determining whether the input fingerprint is a fake by performing learning using the received ROIs.

According to some embodiments of the present disclosure, there is provided a fingerprint recognition device including an image acquisition module acquiring a fingerprint image including an input fingerprint, a preprocessing module generating a preprocessed image by preprocessing the fingerprint image, a minutiae extraction module extracting coordinates of each of orientation points of the input fingerprint, including vector information of the input fingerprint, from the preprocessed image, a matching module determining whether the input fingerprint matches a previously-registered fingerprint by comparing the input fingerprint and the previously-registered fingerprint based on the orientation points of the input fingerprint and a fake detection module receiving regions-of-interest (ROIs), including the orientation points of the input fingerprint, and determining whether the input fingerprint is a fake by performing learning using the received ROIs.

According to some embodiments of the present disclosure, there is provided a smart card including, a fingerprint sensor acquiring a fingerprint image including an input fingerprint and a system chip verifying the input fingerprint, wherein the system chip generates a preprocessed image by preprocessing the fingerprint image, extracts coordinates of each of minutiae and orientation points of the input fingerprint from the preprocessed image, extracts regions-of-interest (ROIs), including the coordinates of each of the minutiae or orientation points of the input fingerprint, and determines whether the input fingerprint is a fake by performing learning using the received ROIs.

BRIEF DESCRIPTION OF THE DRAWINGS

Features will become apparent to those of skill in the art by describing in detail example embodiments with reference to the attached drawings in which.

DETAILED DESCRIPTION

Figure 1:
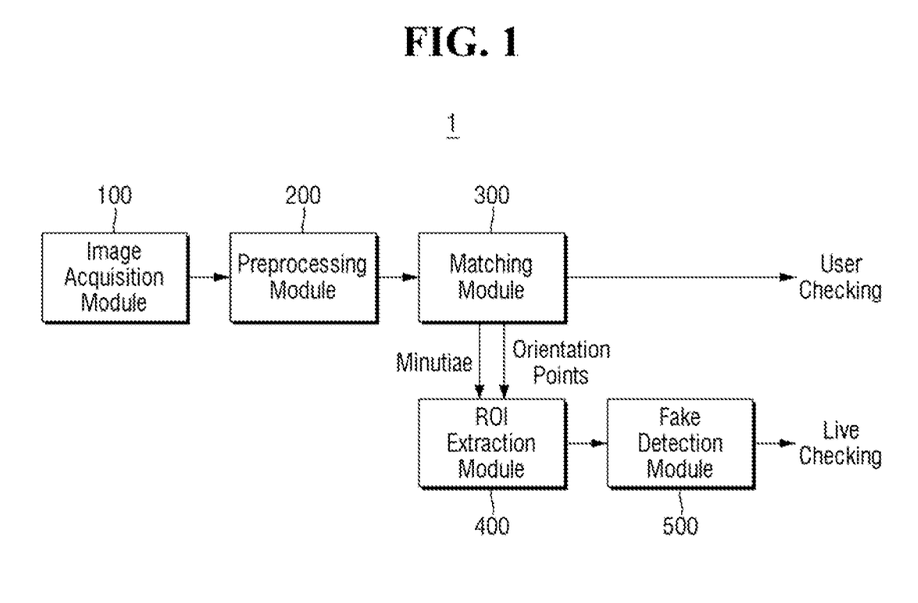
FIG. 1 is a block diagram of a fingerprint recognition device according to an example embodiment.
Figure 2:
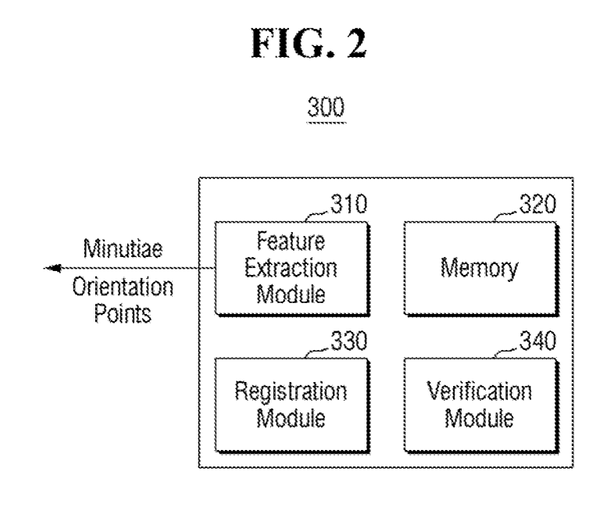
FIG. 2 is a block diagram of a matching module of FIG. 1.

FIG. 1 is a block diagram of a fingerprint recognition device according to an example embodiment. FIG. 2 is a block diagram of a matching module of FIG. 1.

Referring to FIGS. 1 and 2, a fingerprint recognition device 1 may include an image acquisition module 100, a preprocessing module 200, a matching module 300, a region-of-interest (ROI) extraction module 400, and a fake detection module 500.

The image acquisition module 100 may acquire an image of a fingerprint of a user by, e.g., imaging the fingerprint of the user, and may provide the acquired fingerprint image to the preprocessing module 200. The image acquisition module 100 may be a fingerprint sensor that acquires a raw image by sensing the fingerprint of the user. The image acquisition module 100 may include, e.g., a capacitive fingerprint sensor, an optical fingerprint sensor, or an ultrasonic fingerprint sensor.

The preprocessing module 200 may preprocess the fingerprint image acquired by, and received from, the image acquisition module 100. The preprocessing module 200 may generate a preprocessed image by reconfiguring the fingerprint image from the image acquisition module 100. The preprocessing module 200 may provide the preprocessed image to the matching module 300.

The matching module 300 may determine whether an input fingerprint from the image acquisition module 100 matches a previously-registered fingerprint of the user, using the preprocessed image from the preprocessing module 200. For example, the matching module 300 may determine whether the fingerprint pattern of the input fingerprint is identical to the fingerprint pattern of the previously-registered fingerprint. Thus, the matching module 300 may determine whether the input fingerprint is identical to the previously-registered fingerprint.

The matching module 300 may include a minutiae extraction module 310, a memory 320, a registration module 330, and a verification module 340.

The minutiae extraction module 310 may extract minutiae or orientation points from the input fingerprint. For example, the minutiae extraction module 310 may extract the coordinates of each of minutiae or orientation points of the preprocessed image, using an extraction algorithm. The type of extraction algorithm may vary. The minutiae extraction module 310 may provide information regarding the extracted minutiae and orientation points from the input fingerprint to the memory 320 and the ROI extraction module 400.

The memory 320 may store information regarding a fingerprint. The memory 320 may store information regarding the extracted minutiae and orientation points. For example, in a case where there exists a previously-registered fingerprint, the memory 320 may store information regarding minutiae and orientation points of the previously-registered fingerprint. The memory 320 may store a fingerprint pattern image that includes the coordinates of each of minutiae and orientation points extracted from a fingerprint image. The types and patterns of fingerprints that can be stored in the memory 320 may vary.

The registration module 330 may register a fingerprint of a user of the fingerprint recognition device 1. The registration module 330 may register a new fingerprint image via a fingerprint registration operation or may update an existing fingerprint image.

The verification module 340 may determine whether the input fingerprint from the image acquisition module 100 matches the fingerprint of the user by comparing the input fingerprint with the previously-registered fingerprint. For example, the verification module 340 may compare the minutiae and orientation points extracted by the minutiae extraction module 310 with the minutiae and orientation points of the previously-registered fingerprint, stored in the memory 320. For example, the verification module 340 may determine whether the input fingerprint from the image acquisition module 100 matches the previously-registered fingerprint by comparing the input fingerprint and the previously-registered fingerprint in terms of the locations and angles of minutiae and orientation points relative to one another, using a fingerprint pattern image consisting of the coordinates of each of the minutiae and orientation points of the previously-registered fingerprint, stored in the memory 320.

The verification module 340 may determine the degree of similarity between the previously registered fingerprint and the input fingerprint based on a threshold value. If the degree of similarity between the previously registered fingerprint and the input fingerprint is higher than the threshold value, the verification module 340 may determine that the input fingerprint matches the fingerprint of the user. If the degree of similarity between the previously registered fingerprint and the input fingerprint is lower than the threshold value, the verification module 340 may determine that the input fingerprint is not of the user. The threshold value may vary.

In an example embodiment, the verification module 340 may operate independently of the fake detection module 500. Thus, the verification module 340 may determine whether the input fingerprint matches the fingerprint of the user, regardless of whether the input fingerprint is being determined as a fake by the fake detection module 500.

The ROI extraction module 400 may extract ROIs including the minutiae and orientation points extracted by the minutiae extraction module 310, and may provide the extracted ROIs to the fake detection module 500. Thus, the ROIs extracted by the ROI extraction module 400 may become input data for a learning-based neural network to be run by the fake detection module 500.

The fake detection module 500 may determine whether the input fingerprint is a fake by inputting the extracted ROIs from the ROI extraction module 400 to the learning-based neural network. The fake detection module 500 may determine whether the input fingerprint is a genuine fingerprint or a fake fingerprint such as a material (such as rubber or silicone) with a fingerprint thereon, and may output the result of the determination. The fake detection module 500 may determine whether the input fingerprint is a fake by using a learning-based convolutional neural network (CNN). The type of learning-based neural network run by the fake detection module 500 may vary.

The fake detection module 500 may operate independently of the verification module 340. Even if the verification module 340 determines that the input fingerprint matches the fingerprint of the user, the fake detection module 500 may still determine whether the input fingerprint is a fake.

Figure 3:
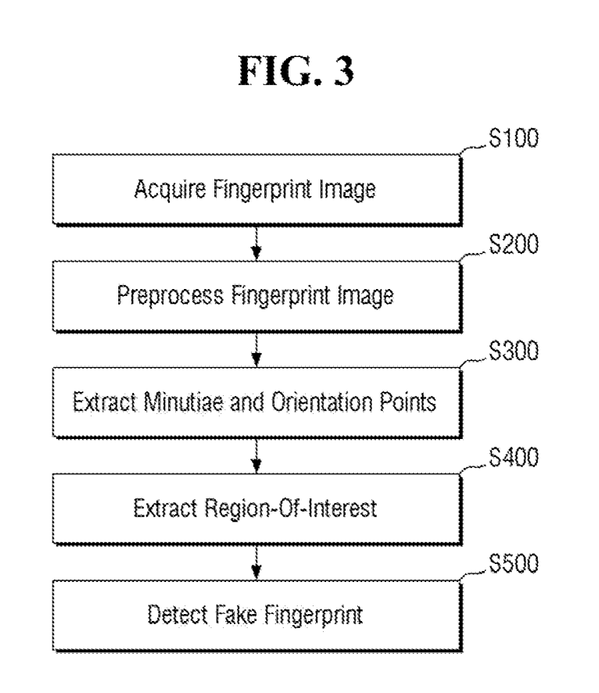
FIG. 3 is a flowchart illustrating the operation of the fingerprint recognition device according to an example embodiment.
Figure 4:
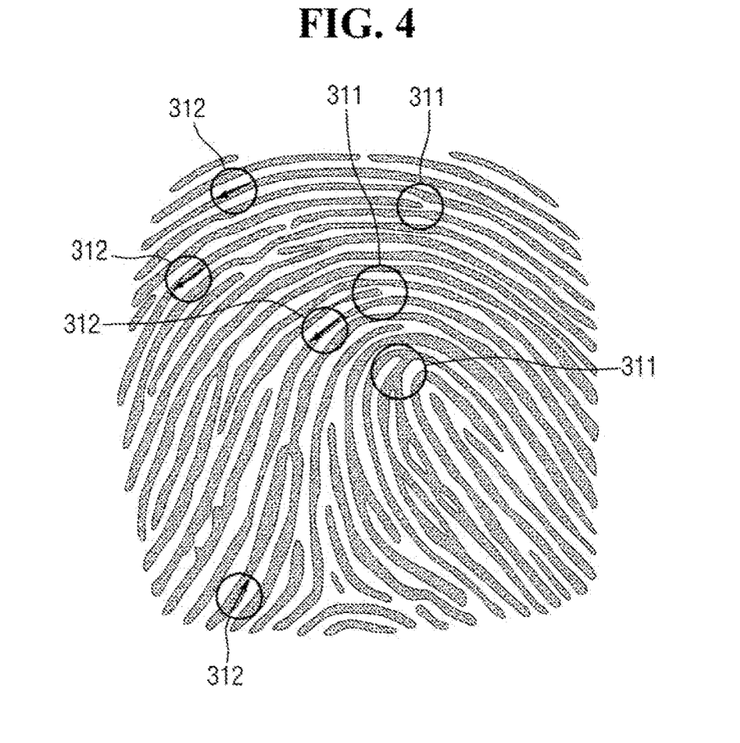
FIG. 4 illustrates a fingerprint image for explaining a minutiae/orientation point extraction operation of the fingerprint recognition device according to an example embodiment.
Figure 5:
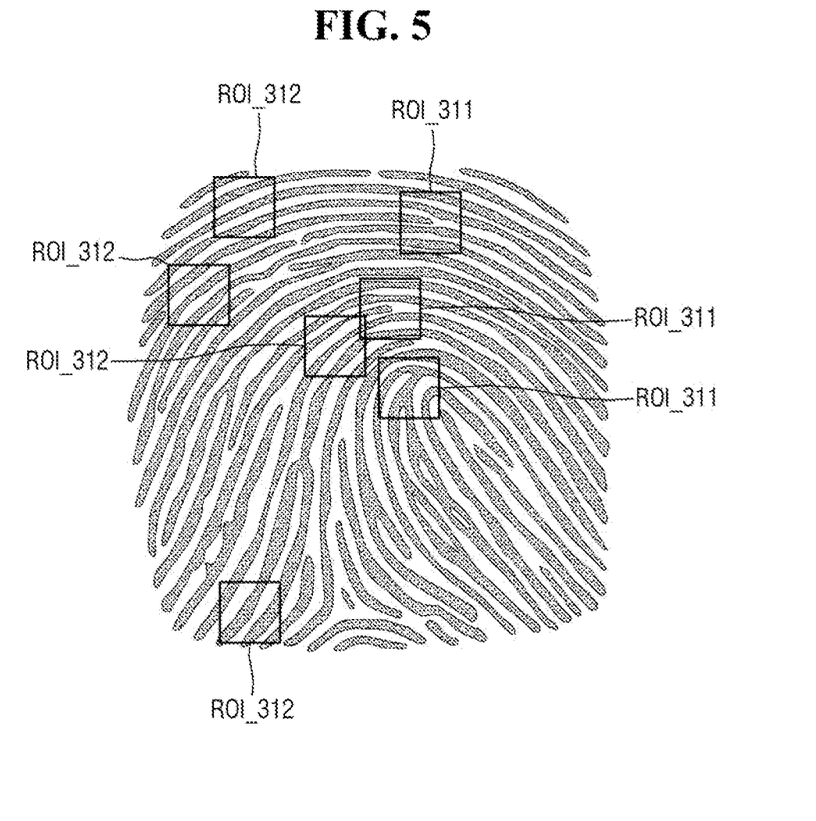
FIG. 5 illustrates a fingerprint image for explaining an ROI extraction operation of the fingerprint recognition device according to an example embodiment.
Figure 6:
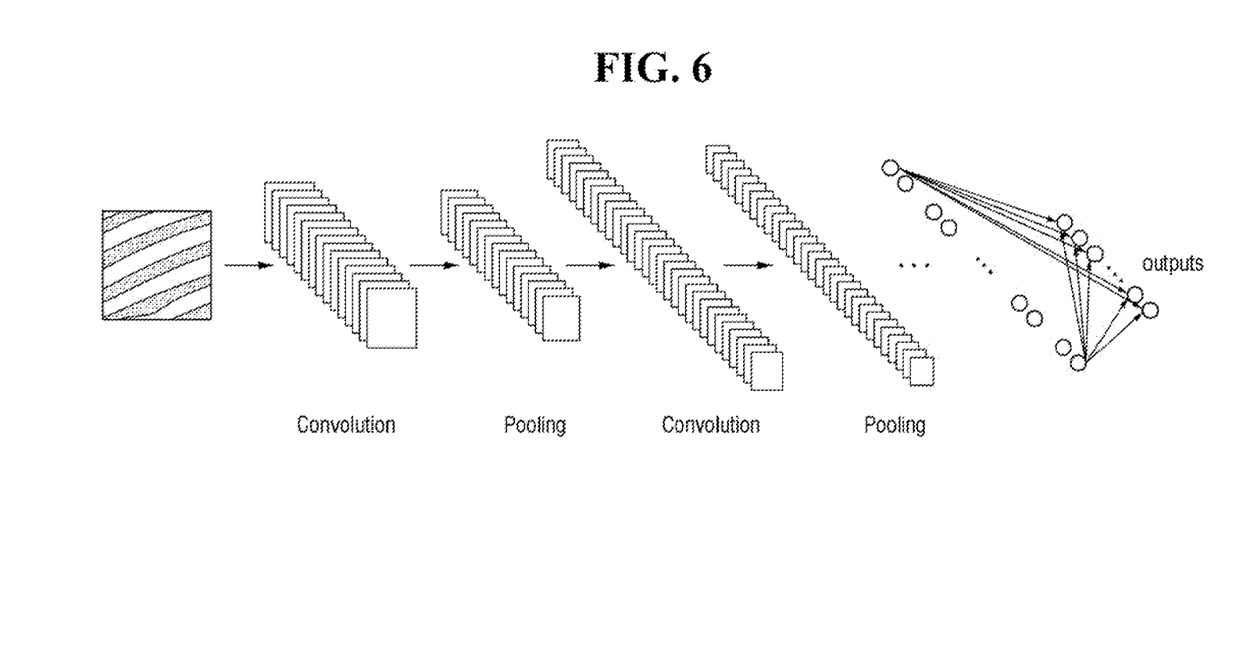
FIG. 6 illustrates an example learning operation of the fake detection module of FIG. 1.

FIG. 3 is a flowchart illustrating the operation of a fingerprint recognition device according to an example embodiment. FIG. 4 illustrates a fingerprint image for explaining a minutiae/orientation point extraction operation of the fingerprint recognition device according to an example embodiment. FIG. 5 illustrates a fingerprint image for explaining an ROI extraction operation of the fingerprint recognition device according to an example embodiment. FIG. 6 illustrates an example learning operation of the fake detection module of FIG. 1.

Referring to FIGS. 1 and 3, an image of a fingerprint is acquired (S100). For example, the fingerprint recognition device 1 may acquire an image of an input fingerprint from the image acquisition module 100.

For example, in a case where the image acquisition module 100 is an optical fingerprint sensor, the image acquisition module 100 may generate fingerprint data of the user as a fingerprint image based on light reflected from a finger of the user.

In another example, in a case where the image acquisition module 100 is a capacitive fingerprint sensor, the image acquisition module 100 may detect variations in capacitance that are caused by the difference in height between the ridges and valleys of the fingerprint of the user and may generate the fingerprint data of the user as a fingerprint image based on the detected capacitance variations.

In yet another example, in a case where the image acquisition module 100 is an ultrasonic fingerprint sensor, the image acquisition module 100 may generate the fingerprint data of the user as a fingerprint image based on the amount of time that it takes for ultrasonic waves to arrive after being reflected from the ridges and valleys of the fingerprint of the user.

Thereafter, the fingerprint image obtained in S100 is preprocessed (S200). For example, the fingerprint recognition device 1 may preprocess the fingerprint image acquired by the image acquisition module 100. For example, the preprocessing module 200 may perform preprocessing by correcting a raw fingerprint image received from the image acquisition module 100.

For example, in a case where the fingerprint image acquired by the image acquisition module 100 has noise for various reasons associated with, e.g., moisture or the amount of exposure to light, the preprocessing module 200 may remove the noise. Thus, the preprocessing module 200 may generate a preprocessed image by restoring any deterioration in the fingerprint image input thereto so that minutiae and orientation points can be properly extracted from the input fingerprint.

Thereafter, referring to FIGS. 1 through 4, minutiae and orientation points are extracted from the preprocessed fingerprint image (S300).

The fingerprint recognition device 1 may extract minutiae 311 and orientation points 312 of the input fingerprint from the preprocessed fingerprint image provided by the preprocessing module 200. For example, the minutiae extraction module 310 of the matching module 300 may extract the coordinates of each of the minutiae 311 and of the orientation points 312 from the preprocessed fingerprint image, using an extraction algorithm embedded in the minutiae extraction module 310. The type of extraction algorithm used by the minutiae extraction module 310 may vary.

The minutiae extraction module 310 may extract, e.g., one or more of the coordinates of each of the minutiae 311 and of the orientation points 312, the distances between the minutiae 311, the distances between the orientation points 312, the distances between the minutiae 311 and the orientation points 312, the angles between the minutiae 311 or between the orientation points 312, etc.

The minutiae 311 may include ridges, valleys, bifurcations, endings, cores, crossovers, islands, deltas, and pores of a fingerprint.

The orientation points 312 may be determined as points that do not match the minutiae 311. The orientation points 312 may include points that clearly show the direction of the input fingerprint. The orientation points 312 may be points where the ridges of the input fingerprint change by more than a predetermined threshold value. For example, the minutiae extraction module 310 may extract a point where the slope of a tangent at one point on a ridge of the input fingerprint changes by more than the predetermined threshold value as an orientation point 312. Thus, the minutiae extraction module 310 may extract a point where the angle between the tangents of ridges of the input fingerprint with respect to one point in the input fingerprint becomes less than the predetermined threshold value as an orientation point 312. The predetermined threshold value may vary.

Each of the orientation points 312 may include vector information of the tangent at the corresponding orientation point 312. In another implementation, each of the orientation points 312 may include vector information of a line that is orthogonal to the tangent at the corresponding orientation point 312. The type of information included in each of the orientation points 312 may vary.

Thereafter, referring to FIGS. 1, 3, and 5, ROIs are extracted (S400). For example, the fingerprint recognition device 1 extracts ROIs (ROI_311 and ROI_312) including the minutiae 311 and the orientation points 312, extracted by the minutiae extraction module 310. For example, the ROI extraction module 400 of the fingerprint recognition device 1 may extract a patch or a block around the coordinates of each of the minutiae 311 or of the orientation point 312 as an ROI. The extracted ROIs may have a predetermined size, e.g., of 24×24 pixels.

The ROIs (ROI_311 and ROI_312) may include the minutiae 311 or the orientation points 312 and images of parts of the input fingerprint around the minutiae 311 or the orientation points 312. ROIs "ROI_311" including the minutiae 311 and ROIs "ROI_312" including the orientation points 312 may partially overlap, e.g., as illustrated in FIG. 5.

Thereafter, referring to FIGS. 1, 3, and 6, a determination is made as to whether the input fingerprint is a fake (S500). For example, the fingerprint recognition device 1 may determine whether the input fingerprint is a fake by using the ROIs (ROI_311 and ROI_312), extracted by the ROI extraction module 400. For example, the fake detection module 500 of the fingerprint recognition device 1 may determine whether the input fingerprint is a fake by performing neural network learning using the ROIs (ROI_311 and ROI_312) as input data.

The fake detection module 500 may determine whether the input fingerprint is a fake by learning via a CNN. The type and number of layers included in the CNN of the fake detection module 500 may vary. For example, the CNN of the fake detection module 500 may include a plurality of convolution layers and a plurality of pooling layers. In another example, the CNN of the fake detection module 500 may include a plurality of convolution layers and a single pooling layer.

As the number of data sets input to a learning-based neural network increases, the learning capability of the neural network can be improved. For example, if there are too few minutiae 311, learning may not be able to be properly conducted via a neural network, and as a result, the fingerprint recognition performance of the fingerprint recognition device 1 may be degraded. To address this, the orientation points 312, which do not coincide with the minutiae 311, may be additionally extracted so that the number of data sets input to the neural network may increase, and the fingerprint recognition performance of the fingerprint recognition device 1 can be improved. Thus, the learning capability of the fingerprint recognition device 1 may be improved.

Figure 7:
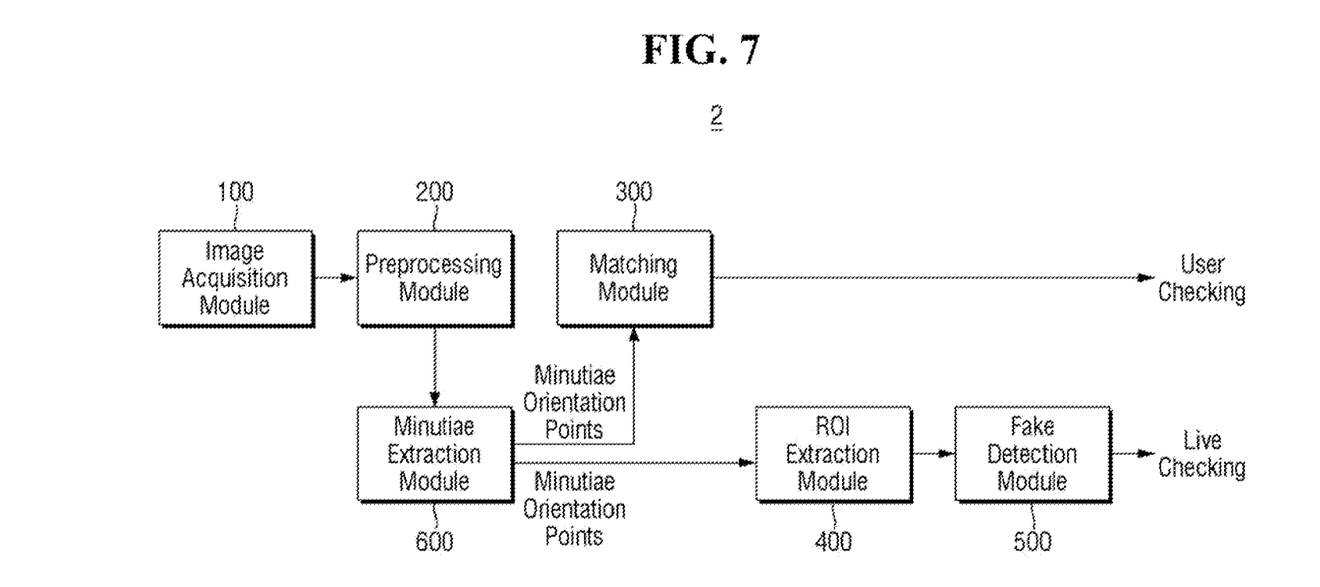
FIG. 7 is a block diagram of a fingerprint recognition device according to an example embodiment.
Figure 8:
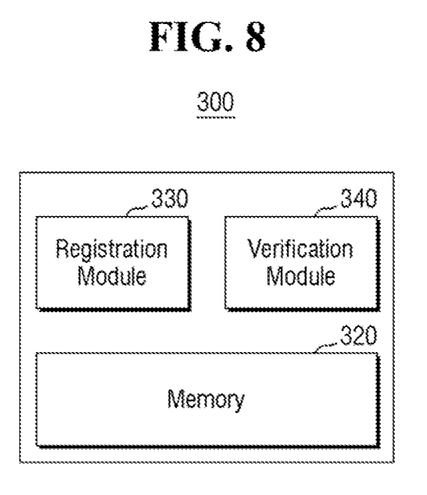
FIG. 8 is a block diagram of a matching module of FIG. 6.

FIG. 7 is a block diagram of a fingerprint recognition device according to an example embodiment. FIG. 8 is a block diagram of a matching module of FIG. 6.

Referring to FIGS. 7 and 8, a fingerprint recognition device 2 may include an image acquisition module 100, a preprocessing module 200, a matching module 300, an ROI extraction module 400, a fake detection module 500, and a minutiae extraction module 600. In the fingerprint recognition device 2, unlike in the fingerprint recognition device 1, the minutiae extraction module 600 is not included in the matching module 300, and is independent from the matching module 300.

The image acquisition module 100 may acquire an image of a fingerprint of a user by recognizing the fingerprint of the user and may provide the acquired fingerprint image to the preprocessing module 200. The image acquisition module 100 may be a fingerprint sensor that acquires a raw image by sensing the fingerprint of the user.

The preprocessing module 200 may preprocess the fingerprint image provided by the image acquisition module 100. The preprocessing module 200 may generate a preprocessed image by reconfiguring the fingerprint image provided by the image acquisition module 100. The preprocessing module 200 may provide the preprocessed image to the minutiae extraction module 600.

The minutiae extraction module 600 may extract minutiae and orientation points of the fingerprint of the user from the preprocessed image from the preprocessing module 200, using an extraction algorithm. For example, the minutiae extraction module 600 may extract the coordinates of each of the minutiae and orientation points of the fingerprint of the user from the preprocessed image. The type of extraction module of the minutiae extraction module 600 may vary.

The minutiae extraction module 600 may provide information regarding the minutiae and the orientation points, extracted by the minutiae extraction module 600, to the matching module 300 and the ROI extraction module 400.

The matching module 300 may determine whether an input fingerprint matches a previously-registered fingerprint of the user by using the information regarding the minutiae and the orientation points, extracted by the minutiae extraction module 600. For example, the matching module 300 may determine whether the minutiae and the orientation points of the input fingerprint match the minutiae and the orientation points of the previously-registered fingerprint. Thus, the matching module 300 may verify whether the input fingerprint matches the previously-registered fingerprint.

The matching module 300 may include a memory 320, a registration module 330, and a verification module 340.

The registration module 330 may register a fingerprint of a user of the fingerprint recognition device 2. The registration module 330 may register a new fingerprint image via a fingerprint registration operation or may update an existing fingerprint image.

The verification module 340 may determine whether the input fingerprint from the image acquisition module 100 matches the fingerprint of the user by comparing the input fingerprint with the previously-registered fingerprint. For example, the verification module 340 may compare the minutiae and orientation points provided by the minutiae extraction module 600 with the minutiae and orientation points of the previously-registered fingerprint, stored in the memory 320. For example, the verification module 340 may determine whether the input fingerprint matches the previously-registered fingerprint by comparing the input fingerprint and the previously-registered fingerprint in terms of the locations and angles of minutiae and orientation points relative to one another, using a fingerprint pattern image consisting of the coordinates of each of the minutiae and orientation points of the previously-registered fingerprint, stored in the memory 320.

The memory 320 may store information regarding the minutiae and orientation points of the previously-registered fingerprint, received from the minutiae extraction module 600. The memory 320 may store a fingerprint pattern image consisting of the coordinates of each of minutiae and orientation points extracted from a fingerprint image by the minutiae extraction module 600. The types and patterns of fingerprints that can be stored in the memory 320 may vary.

The ROI extraction module 400 may extract ROIs including the minutiae and orientation points extracted by the minutiae extraction module 600, and may provide the extracted ROIs to the fake detection module 500. Thus, the ROIs extracted by the ROI extraction module 400 may become input data for a learning-based neural network to be run by the fake detection module 500.

The fake detection module 500 may determine whether the input fingerprint is a fake by inputting the extracted ROIs from the ROI extraction module 400 to the learning-based neural network. The fake detection module 500 may determine whether the input fingerprint is a genuine fingerprint or a fake fingerprint such as a material (such as rubber or silicone) with a fingerprint thereon, and may output the result of the determination. The fake detection module 500 may determine whether the input fingerprint is a fake by using a learning-based CNN. The type of learning-based neural network run by the fake detection module 500 may vary.

Figure 9:
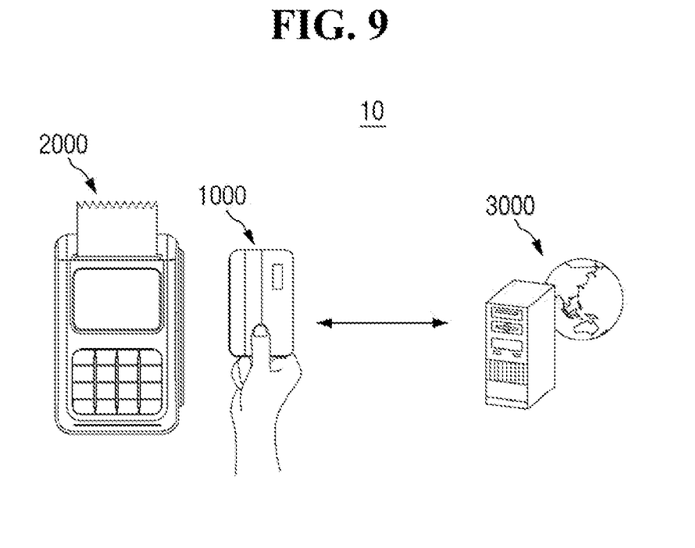
FIG. 9 illustrates a smart card payment system including a fingerprint recognition device according to an example embodiment.

FIG. 9 illustrates a smart card payment system including a fingerprint recognition device according to an example embodiment.

Referring to FIG. 9, a smart card payment system 10 may include a smart card 1000, which is a fingerprint recognition-based smart card, a payment terminal 2000, and a payment server 3000.

The smart card 1000 may be a plastic card with a semiconductor chip with various functions embedded therein. In an example embodiment, the smart card 1000 may be configured to be of a contact type that is operable when an integrated chip (IC) in the smart card 1000 is placed in contact with the payment terminal 2000, or may be configured to be of a non-contact type capable of exchanging data when the IC in the smart card 1000 is within the vicinity of the payment terminal 2000.

In an example embodiment, as payment request information including deposit information is output from the payment terminal 2000 offline or online, the smart card 1000 may output payment method information corresponding to the payment request information.

The smart card 1000 may include a fingerprint recognition device 1. A learning-based neural network embedded in a fake detection module 500 of the fingerprint recognition device 1 may be implemented as program instructions that can be executed by various computing means, and may be recorded on a, e.g., fixed and tangible, computer-readable medium. For example, the smart card 1000 may include the learning-based neural network in a hardware accelerator.

In an example embodiment, the payment terminal 2000, which is means for storing deposit information such as the type, quantity, and price of goods being sold online or offline and managing sales information regarding the goods, may be a point-of-sales (POS) terminal in an offline store. In another example embodiment, the payment terminal 2000 may be an online shopping website system. In another example embodiment, the payment terminal 2000 may be a terminal capable of reading payment-related information by accessing the smart card 1000 and communicating with the payment server 3000.

The payment terminal 2000 may be installed in an offline store, and may be means for reading product information from a barcode attached to each product via a reader. The product information may include the type, the identification code, and the price of each product.

The payment terminal 2000 may transmit sales-related information to the payment server 3000. In an example embodiment, the sales-related information may include at least one of price information of each product, an identifier of the payment terminal, the time when the payment terminal 2000 reads the price information of each product, the type of operation to be processed by the payment terminal 2000, domain information of the management server of the payment terminal 2000, and deposit account information of the holder of the payment terminal 2000.

Also, the payment terminal 2000 may transmit payment information read from the smart card 1000 to the payment server 3000. The payment information includes payment grade information of a registered user of the smart card 1000 and payment method information of the user.

In an example embodiment, the payment method information may include payment account information or payment card information. In an example embodiment, the payment account information, which may be bank account information, may include at least one of a bank account number, an account password, and a security-related authentication number. In an example embodiment, the payment card information may include at least one of payment card company information, a payment card number, and a payment card password.

Also, the payment terminal 2000 may determine whether a user corresponding to biometric information, among the payment information read from the smart card 1000, is the registered user of the smart card 1000, and may transmit payment grade information corresponding to the user index of the registered user of the smart card 1000 to the payment server 3000, if the user corresponding to the biometric information from the smart card 1000 is the registered user of the smart card 1000.

The payment server 3000 may determine whether to authorize a payment based on the sales-related information and the payment information, received from the payment terminal 2000 and transmits the result of the determination to the payment terminal 2000.

In an example embodiment, the payment server 3000 may determine whether to authorize a payment based on the payment information, e.g., based on the payment method information and the payment grade information, received from the payment terminal 2000.

For example, in a case where the payment information is payment account information, the payment server 3000 may be a payment server of a financial institution (such as a bank) where a user's payment account has been opened. For example, in a case where the payment information is payment card information, the payment server 3000 may be a payment server of a financial institution that has issued a user's payment card.

The term "normal user", as used herein, refers to a user who has been registered with the payment server 3000 and holds a payment account or a payment card with a sufficient balance for the amount requested for payment.

In a case where the payment server 3000 determines that the user corresponding to the payment information read from the smart card 1000 is a normal user, the payment server 3000 may identify sales price information and the identifier of the payment terminal 2000 from the sales-related information, and may determine whether to authorize a payment by comparing the identified information with the payment information. The case where the payment server 3000 determines that the user corresponding to the payment information read from the smart card 1000 is a normal user may include a case where a matching module 300 of the fingerprint recognition device 1 outputs information indicating that a fingerprint input to the fingerprint recognition device 1 matches a fingerprint of a registered user and the fake detection module 500 of the fingerprint recognition device 1 outputs information indicating that the input fingerprint is not a fake fingerprint but a genuine fingerprint.

Figure 10:
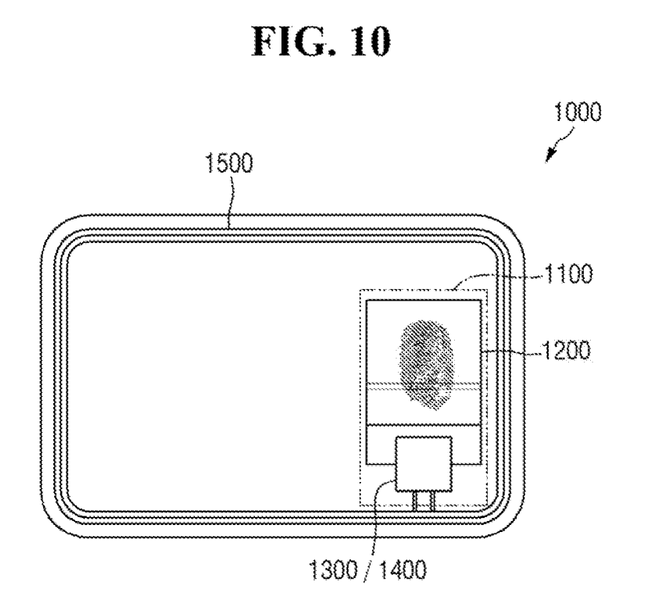
FIG. 10 illustrates a biometric smart card according to an example embodiment.
Figure 11:
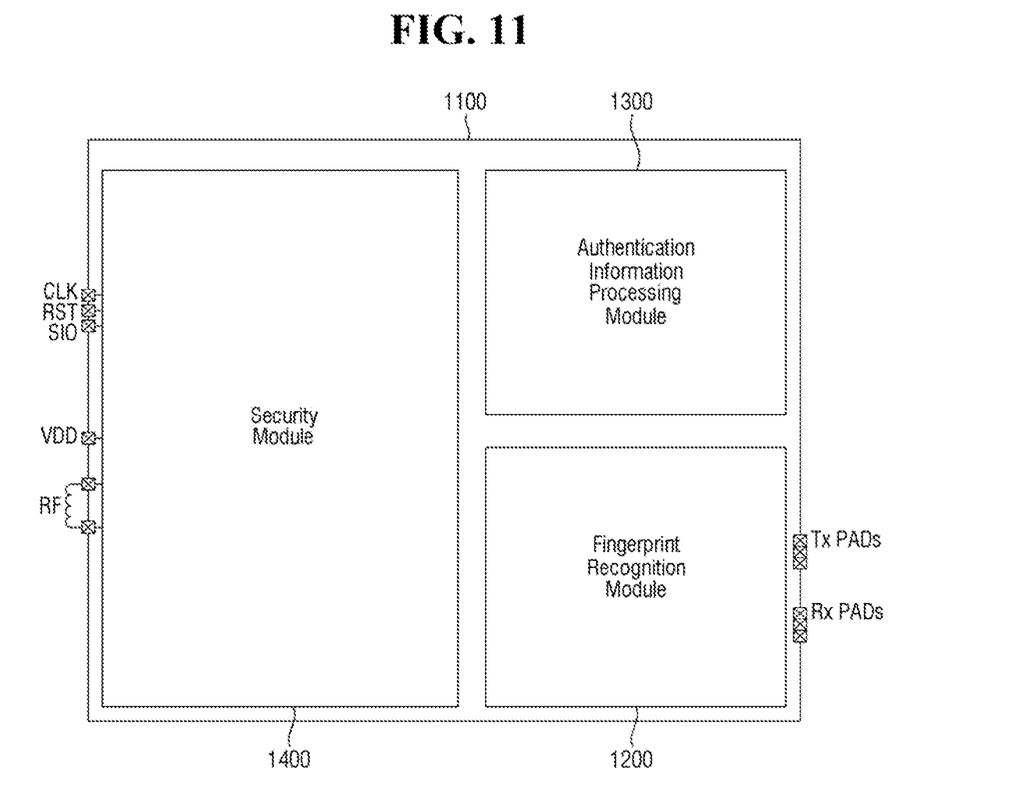
FIG. 11 illustrates a biometric IC according to an example embodiment.

FIG. 10 illustrates a biometric smart card according to an example embodiment, and FIG. 11 illustrates a biometric IC according to an example embodiment.

Referring to FIGS. 10 and 11, a biometric smart card 1000 may include an antenna 1500 and an IC 1100. The IC 1100 may include a fingerprint recognition module 1200, an authentication information processing module 1300, and a security module 1400 in a single chip.

The fingerprint recognition module 1200 may be means for enhancing the security of the smart card 1000. The fingerprint recognition module 1200 may determine whether fingerprint information of a current user of the smart card 1000 matches fingerprint information of the actual owner of the smart card 1000 (i.e., the registered user of the smart card 1000). Then, if the fingerprint information of the current user of the smart card 1000 matches the fingerprint information of the registered user of the smart card 1000, the fingerprint recognition module 1200 may verify the current user of the smart card as being the actual owner of the smart card 1000 and may unlock the security module 1400, which is embedded in the smart card 1000, for a predetermined amount of time. The fingerprint recognition module 1200 may automatically lock the security module 1400 a predetermined amount of time later, to prevent an illegal use of the smart card 1000 in advance.

In an example embodiment, the fingerprint recognition module 1200 may be a sensor for sensing a fingerprint in an electrostatic manner, a piezoelectric manner, or the like. The fingerprint recognition module 1200 may be of a swipe type for sensing a fingerprint from a swipe with a finger or of an area type for sensing a fingerprint from a touch with a finger that lingers for more than a predetermined amount of time.

In an example embodiment, the security module 1400 may be an IC for recording and storing card identification information of the smart card 1000. The security module 1400 may transmit the card identification information to the payment terminal 2000 in a contact or non-contact method, and may perform an electronic payment.

In an example embodiment, the security module 1400 may temporarily record card identification information, and may modify or delete the recorded card identification information. The security module 1400 may record card identification information for one of multiple payment method information. Card identification information, which corresponds to payment method information, includes information used for an electronic payment, such as card number information, card expiration date information, and card security information.

All the elements of the security module 1400 and data to be processed by the security module 1400 may be encrypted with random keys to meet security requirements. For example, the security module 1400 may encrypt and store fingerprint information of the actual owner of the smart card 1000 (i.e., the registered user of the smart card 1000), and may prevent the fingerprint information from being exposed.

Thereafter, when fingerprint information extracted by the fingerprint recognition module 1200 upon use of the smart card 1000 needs to be verified, the security module 1400 may receive registered fingerprint information from the authentication information processing module 1300, and may determine whether to authorize use of the smart card 1000 in accordance with whether the extracted fingerprint information matches the registered fingerprint information.

In an example embodiment, the authentication information processing module 1300 may process a raw fingerprint image received from the fingerprint recognition module 1200, and may thereby generate a fingerprint template. The raw fingerprint image may include the features or minutiae of a fingerprint such as ridge endings or bifurcations. The authentication information processing module 1300 may acquire template information of a fingerprint image through minutiae detection, i.e., fingerprint information for verification.

The fingerprint recognition module 1200, the authentication information processing module 1300, and the security module 1400 may be incorporated into a single IC.

As described above, embodiments may provide a fingerprint recognition device with an improved learning ability. Embodiments may also provide a smart card with an improved learning ability.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A fingerprint recognition device, comprising:
   an image acquisition module configured to acquire a fingerprint image including an input fingerprint;
   a preprocessing module configured to generate a preprocessed image by preprocessing the fingerprint image;
   a minutiae extraction module configured to extract coordinates of minutiae of the input fingerprint using the preprocessed image, and configured to extract coordinates of orientation points of the input fingerprint using the preprocessed image, wherein the orientation points are points on ridges of the input fingerprint where slopes of lines tangent to the ridges change by more than a threshold value; and
   a fake detection module configured to receive regions-of-interest (ROIs), including the coordinates of the minutiae of the input fingerprint and the coordinates of the orientation points of the input fingerprint, and determine whether the input fingerprint is a fake by performing learning using the ROIs.

2. The fingerprint recognition device as claimed in claim 1, further comprising an ROI extraction module configured to extract the ROIs using the preprocessed image, and configured to input the ROIs to the fake detection module.

3. The fingerprint recognition device as claimed in claim 1, wherein the ROIs include patches with a predetermined size around the coordinates of the minutiae of the input fingerprint and around the coordinates of the orientation points of the input fingerprint.

4. The fingerprint recognition device as claimed in claim 1, wherein the fake detection module is configured to perform learning using a convolutional neural network and using the ROIs as input for the convolutional neural network.

5. The fingerprint recognition device as claimed in claim 1, further comprising a matching module configured to determine whether the input fingerprint matches a previously-registered fingerprint by comparing the input fingerprint with the previously-registered fingerprint based on the minutiae and orientation points of the input fingerprint.

6. The fingerprint recognition device as claimed in claim 5, wherein the minutiae extraction module is embedded in the matching module.

7. The fingerprint recognition device as claimed in claim 5, wherein:
   the matching module and the minutiae extraction module are configured as separate elements, and
   the matching module is configured to receive the minutiae and orientation points of the input fingerprint from the minutiae extraction module.

8. The fingerprint recognition device as claimed in claim 1, wherein the minutiae extraction module is configured to determine the coordinates of each of the minutiae of the input fingerprint to be different from the coordinates of each of the orientation points of the input fingerprint.

9. The fingerprint recognition device as claimed in claim 1, wherein the coordinates of the orientation points of the input fingerprint include respective vector information for each of the orientation points.

10. A fingerprint recognition device, comprising:
    an image acquisition module configured to acquire a fingerprint image including an input fingerprint;
    a preprocessing module configured to generate a preprocessed image by preprocessing the fingerprint image;
    a minutiae extraction module configured to extract coordinates of orientation points of the input fingerprint, including vector information for each orientation point, using the preprocessed image, wherein the orientation points are points on ridges of the input fingerprint where slopes of lines tangent to the ridges change by more than a threshold value;
    a matching module configured to determine whether the input fingerprint matches a previously-registered fingerprint by comparing the input fingerprint with the previously-registered fingerprint based on the orientation points of the input fingerprint; and
    a fake detection module configured to receive regions-of-interest (ROIs), including the orientation points of the input fingerprint, and configured to determine whether the input fingerprint is a fake by performing learning using the ROIs.

11. The fingerprint recognition device as claimed in claim 10, wherein the minutiae extraction module is further configured to extract coordinates of minutiae of the input fingerprint, which are different from the coordinates of the orientation points of the input fingerprint, using the preprocessed image.

12. The fingerprint recognition device as claimed in claim 10, further comprising an ROI extraction module configured to extract the ROIs using the preprocessed image, and configured to input the ROIs to the fake detection module.

13. The fingerprint recognition device as claimed in claim 10, wherein the fake detection module is configured to perform learning using a convolutional neural network and using the ROIs as input for the convolutional neural network.

14. The fingerprint recognition device as claimed in claim 11, wherein the ROIs include patches with a predetermined size around the coordinates of the minutiae of the input fingerprint and around the coordinates of the orientation points of the input fingerprint.

15. A smart card, comprising:
a fingerprint sensor configured to acquire a fingerprint image including an input fingerprint; and
a system chip configured to generate a preprocessed image by preprocessing the fingerprint image, extract coordinates of minutiae of the input fingerprint and coordinates of orientation points of the input fingerprint using the preprocessed image, extract regions-of-interest (ROIs), including the coordinates of the minutiae of the input fingerprint and the coordinates of the orientation points of the input fingerprint, and determine whether the input fingerprint is a fake by performing learning using the ROIs, wherein the orientation points are points on ridges of the input fingerprint where slopes of lines tangent to the ridges change by more than a threshold value.

16. The smart card as claimed in claim 15, wherein the coordinates of the orientation points of the input fingerprint include respective vector information for each of the orientation points.

17. The smart card as claimed in claim 15, wherein the coordinates of each of the minutiae of the input fingerprint are different from the coordinates of each of the orientation points of the input fingerprint.

18. The smart card as claimed in claim 15, wherein the system chip is configured to determine whether the input fingerprint matches a previously-registered fingerprint by comparing the input fingerprint and the previously-registered fingerprint based on the coordinates of the minutiae of the input fingerprint and the coordinates of the orientation points of the input fingerprint.

19. The smart card as claimed in claim 15, wherein the ROIs include patches with a predetermined size around the coordinates of the minutiae of the input fingerprint and around the coordinates of the orientation points of the input fingerprint.

20. The fingerprint recognition device as claimed in claim 9, wherein for each of the orientation points, the respective vector information is vector information of a line tangent to a ridge at that orientation point or vector information of a line orthogonal to the line tangent to the ridge at that orientation point.

* * * * *